US00RE35843E

United States Patent [19]

Diamond et al.

[11] E Patent Number: Re. 35,843

[45] Reissued Date of Patent: Jul. 14, 1998

[54] LOW PRESSURE NON-BARRIER TYPE, VALVED DISPENSING CAN

[75] Inventors: George B. Diamond; Ralph Helmrich, both of Glen Gardner, N.J.

[73] Assignee: Dispensing Container Corporation, N.J.

[21] Appl. No.: 697,689

[22] Filed: Sep. 5, 1996

Related U.S. Patent Documents

Reissue of:

[64] Patent No.: 5,211,317
Issued: May 18, 1993
Appl. No.: 900,414
Filed: Jun. 18, 1992

[51] Int. Cl.[6] ..... B67D 5/42

[52] U.S. Cl. ..... 222/394; 222/402.1; 220/666

[58] Field of Search ..... 222/394, 1, 92, 222/389, 402.1, 402.18; 220/666

[56] References Cited

U.S. PATENT DOCUMENTS

| | | | |
|---|---|---|---|
| 3,236,420 | 2/1966 | Leika | 222/146 |
| 3,471,092 | 10/1969 | Hickey | 239/579 |
| 4,271,991 | 6/1981 | Diamond | 222/389 |
| 4,641,765 | 2/1987 | Diamond | 222/386.5 |
| 4,940,171 | 7/1990 | Gilroy | 222/402 |
| 5,211,317 | 5/1993 | Diamond et al. | 222/394 |

FOREIGN PATENT DOCUMENTS 2109894 4/1990 Japan .

*Primary Examiner*—Philippe Derakshani
*Attorney, Agent, or Firm*—Ostrolenk, Faber, Gerb & Soffen, LLP

[57] ABSTRACT

A low pressure aerosol dispensing can which is distinguished from existing high pressure aerosol dispensing cans. The generally cylindrical can has a thin wall thickness, like that of a carbonated beverage can, which can be distorted by finger pressure but whose shape is maintained by internal gas pressure. The liquid contents to be dispensed and the propellant gas are mixed in the can. The dispensing valve at the top of the can dispenses the liquid contents and propellant in a controlled manner. The valve may include an additional narrow bore vapor tap between the gaseous propellant head space in the can and the valve chamber for delivering extra gas for atomizing the liquid and propelling it from the nozzle. The gas pressure in the can is coordinated with the can wall and bottom thickness so that the can will have sufficient distortion resistance and burst resistance at elevated temperature. Yet the can has side walls of a thickness low enough to permit the can to be easily crushed by hand pressure when the can is empty.

26 Claims, 2 Drawing Sheets

LOW PRESSURE NON-BARRIER TYPE, VALVED DISPENSING CAN

Matter enclosed in heavy brackets [ ] appears in the original patent but forms no part of this reissue specification; matter printed in italics indicates the additions made by reissue.

BACKGROUND OF THE INVENTION

The present invention relates to an aerosol type, non-barrier, spray can for materials in fluid or liquid form and particularly relates to an especially thin walled aerosol spray can.

Many fluent materials and particularly liquid materials are dispensed from pressurized aerosol spray cans of the non-barrier type, wherein there is no separation between the fluent material to be dispensed and the can pressurizing propellent. The present invention is primarily directed to a non-barrier can. A barrier can has a moveable barrier in it, such as a piston or an enlarged or flexible diaphragm, where the material to be dispensed is at the side of the barrier toward the outlet from the can and the propellant is on the other side of the barrier and pushes against the barrier and pushes the fluent material through the can outlet. The propellant typically is not expelled along with the product. Barrier cans are primarily designed for handling viscous products, because a non-barrier can will not be able to dispense these products.

The aerosol spray can of the invention has a spray forming and dispensing valve on it with a small flow orifice which communicates between the interior of the can and a small swirl chamber in the spray dispensing button. The mixed fluent material and propellant enter the swirl chamber in the spray button and from there exit the spray button through a spray outlet. When the valve is opened, the elevated pressure in the can forces a mixture of the propellant and the fluent material through the valve orifice into the swirl chamber. The rapid drop to ambient pressure as the swirling mixed propellant and fluent material exit the orifice of the button into the surrounding atmosphere, sometimes coupled with the flashing off into gaseous form of some still liquid propellant, and coupled with the rapid expansion of the compressed propellant as it exits the valve orifice, atomizes the fluent material and breaks it into small droplets. This breakup is sometimes aided by propellant vapor which flows from the can through an additional vapor tap into the valve chamber which increases the amount of propellant available to force the spray mixture out of the button exit spray orifice. If a stream or foam is desired, a modified valve having no swirl chamber and a large orifice is used.

Objectives for such cans include being able to expel essentially all of the fluent material from the can and for the character of the spray, stream or foam to remain as uniform as possible throughout the entire contents of the can.

The conventional ways to accomplish these objectives have been, in the case of compressed gases, to use the initial pressures of about 90–140 psig or 621–965 kPa and, in the case of liquified gases, to use sufficiently large amounts of the liquified gas. In the case of liquified gas, the pressures of 70° F. or 21° C. may only be about 30–50 psig or 207–345 kPa. These pressures, however, rise to much higher values at higher temperatures due to the temperature/pressure relation of liquified gases. The increased pressure in the can has required that the can wall be made relatively thick so that the can does not permanently distort or rupture from the high pressure encountered during can filling, storage, transportation and use. During some of the storage and transportation stages, cans are exposed to elevated ambient temperatures, so that the can must be able to withstand the elevated gas pressures caused by elevated temperatures.

Several government agencies have mandated that certain types of aerosol cans have particular strengths or distortion and burst resistances for safety. This is to prevent can distortion and the danger which accompanies the bursting of a pressurized aerosol can. For example, the United States Department of Transportation (DOT) has a regulation that for sealed cans having less than 27.7 fluid ounce or 819.2 cc capacity, the can must be able to withstand and not permanently distort at an internal pressure equal to the equilibrium pressure of its intended contents, including fluent material and propellant at 130° F. or 54.4° C., and that the pressure in the can must not exceed 140 psig or 965 kPa at 130° F. or 54.4° C. If the pressure in the can exceeds 140 psig or 965 kPa, then there are special specifications for that can. The DOT requires that there be no permanent distortion of the can at 130° F. or 54.4° C. and that the same can not burst at a pressure that is one and one-half times as great as the pressure at 130° F. or 54.4° C. For example, if the equilibrium pressure in the can at 130° F. or 54.4° C. is 140 psig or 965 kPa, then the can should not burst at 210 psig or 1448 kPa.

Aerosol spray cans for spraying fluent materials use various liquified and compressed gas propellants. Liquified propellants have included chlorofluorocarbons, some sold under the trademark "Freon", some of which are no longer permitted for use as a spray can propellant except for use with certain pharmaceuticals, or hydrocarbons, or dimethylether and other volatile liquids. Compressed gas propellants have included carbon dioxide, nitrous oxide, nitrogen, air, etc. Liquid propellants have a benefit over compressed gases because just enough liquid evaporates to maintain relatively constant gas pressure in the can and the remaining liquid provides a reservoir for producing more gas as propellant is expelled. With compressed gas propellants, in contrast, enough gaseous propellant must be initially placed in the can to be able to spray out or otherwise dispense the entire contents of the can at sufficient pressure.

In order for aerosol dispenser cans to withstand the expected elevated internal pressures and to meet DOT standards, known cans have been made of metal, i.e. steel or aluminum, with a great enough wall thickness. For a typical steel can of 2 1/16 inch or 52.4 mm in diameter to safely contain pressurized contents at 140 psig or 965 kPa, that is, a can not made for containing extra high pressures, the wall thickness has been about 0.008 to 0.012 inch or 0.020 mm to 0.304 mm. The bottom and top of the can, which will normally bulge and distort outward under too much pressure, have had a thickness in the range of 0.012 to 0.018 inches or 0.304 to 0.457 mm. With the above noted can wall and top and bottom thicknesses, a steel can 5 9/16 inches or 14.13 cm high might have a weight of 59 grams. For an aluminum can of the same dimensions to be able to withstand the pressures indicated, it would have a wall thickness of about 0.012 inches or 0.304 mm and a bottom thickness of about 0.016 inches or 0.406 mm. These steel and aluminum cans are thick walled enough to be rigid and not deformed under normal finger force of about 5–10 lbs or 2.27–4.55 kilograms both when they are filled and pressurized and when they are empty, and they will stay rigid and will not collapse under a vacuum of about 24 inches or 60 cm of mercury. This vacuum is usually used during valve crimping to remove residual air.

Both the steel and the aluminum aerosol spray cans used now have certain drawbacks due to heightened concerns about environmental degradation. It is desirable to reduce the amount of metal used in a can to ease the later disposal burden and because the ores and minerals used in producing cans are in diminishing supply. In addition, more energy is consumed in obtaining the metal ore, in producing the metal and in manufacturing thicker walled cans than thinner walled cans. The cost of transporting the metal of the cans at every stage from initial ore production, through transporting the metal for making the cans to transporting the filled cans is also to be considered. Because billions of pressurized aerosol cans are produced and used each year, a reduction in the wall thicknesses of aerosol spray cans will rapidly have considerable environmental benefit.

Use of lighter weight, thin walled cans as containers for fluent materials is known. For example, for carbonated beverages and some foods, there has been a change from thicker walled, heavier steel cans to lighter, thin walled aluminum and steel cans. In the case of sparkling beverages, the dissolved gas, such as carbon dioxide, and in the case of non-gaseous food, where a gas is added to the can, e.g. liquid nitrogen or compressed air, the added gas pressure gives the soft walled cans rigidity for handling, so that the cans will not be crushed or deformed by normal finger pressure before they are opened. Such soft walled cans, however, have not been used to dispense their contents under pressure. The cans do not have a valve or other outlet system for dispensing their contents which are under pressure. The cans are initially sealed closed. When they are opened, the container pressure immediately goes to atmospheric and the cans lose their rigidity.

SUMMARY OF THE INVENTION

It is the primary object of the present invention to provide a non-barrier, aerosol spray dispensing can which can be thinner walled than previous aerosol dispensing cans.

Another object of the invention is to provide an aerosol spray dispensing can which satisfies various environmental concerns by reducing the amount of metal or other material needed for producing each can.

A further object is to satisfy environmental concerns by reducing the quantity of propellant required for use in an aerosol can or by replacing it, in whole or in part, with a more environmentally acceptable propellant.

Another object of the invention is to provide an aerosol spray dispensing can which has a wall thickness that is below the level where the can would be rigid when empty and unpressurized, yet which walls are sufficiently rigid when the can is pressurized that the can will not be inadvertently or prematurely crushed, and that the can will satisfy government distortion resistance and burst strength requirements, and will be easily crushable when empty.

Another object of the invention is to satisfy environmental concerns by providing such an aerosol spray dispensing can that can be used with non-polluting and/or non-flammable gases.

A further object is to provide a lower pressure aerosol spray can which will retain sufficient pressure such that it will dispense all of its fluent material contents in the desired, acceptably uniform, selected spray, foam or stream form.

The present invention concerns a non-barrier type can, pressurized material dispensing system, which uses a liquified gas propellant or a compressed gas propellant, or mixture of them, and which propellant is mixed with the fluent material product to be dispensed and wherein the propellant forces the product out of the can through an aerosol valve and at the same time gives rigidity to the can. The can is thin walled yet sufficiently rigid in use, and it can satisfy government distortion resistance and burst strength requirements. The can wall is thin enough that it may be easily distorted by finger pressure, but the wall shape can be supported by the gas pressure in the can against distortion caused by finger pressure until the fluent material contents of the can have been sprayed out and the residual propellant has been released. For example, in a 2 1/16 inch or 52.4 mm diameter steel can, the can has a wall thickness that does not exceed 0.0065 inches or 0.165 mm and has a preferred wall thickness, for economy of materials, of about 0.004–0.005 inches or 0.102 mm–0.127 mm. When the can is not pressurized, the can wall is not rigid, that is, normal finger pressure can distort the wall. In particular, the can wall can be deflected inwardly by about ¼ inch when finger force of 5–10 lbs or 2.27–4.55 kilograms is applied to the can wall, and the can is easily crushable by hand pressure. The can will expand outwardly by about 0.003–0.006 inch or 0.076–0.152 mm under a pressure of 100 psig or 690 kPa but will contract back to its original diameter of about 2 1/16 inches or 52.4 mm when the pressure is again atmospheric.

In order to meet minimum government regulated pressure containment requirements, standard wall thickness aerosol dispensing cans of 2 1/16 inches or 52.4 mm diameter are made of aluminum with walls that are of about a thicknesses of 0.012 inches or 0.305 mm or of steel with walls that are of about a thickness in the range of 0.008–0.012 inch or 0.203 mm–0.305 mm. In the standard can, the starting can pressure is typically at least 90–140 psig or 621–965 kPa for compressed gas propellants. For liquified gas propellants, in contrast, the starting can pressure may typically be in the range of 30–50 psig or 207–345 kPa at 70° F. or 21°. But, at 130° F. or 54.4° C., this requires the above can wall thickness to contain the higher pressure generated at the elevated temperature. Even when it is empty, the standard can does not deform appreciably inwardly under a local, e.g. finger, force of 5–10 lbs or 2.27–4.55 kilograms, which is the force under which the can of the invention would deflect inwardly by about ¼ inch. The standard can will be deflected inwardly by about ¼ inch only by a minimum force of about 20 lbs or 9.1 kilograms and is not easily crushable by hand pressure.

Cans according to the invention satisfy a DOT (Department of Transportation) regulation that the can pressure at 130° F. or 54.4° C. does not permanently distort the can and that the can does not burst at one- and one-half times the pressure at 130° F. or 54.4° C. The cans according to the invention are pressurized in a manner that the pressure at 130° F. or 54.4° C. does not exceed 120–130 psig or 827–896 kPa and are constructed in such a manner that they do not permanently distort at 120 psig or 827 kPa and do not burst at one- and one-half times this pressure, which is 180 psig or 1241 kPa. The cans according to the invention will, however, collapse under less than about 18 inches or 46 cm of mercury of vacuum and therefore cannot be vacuum crimped to a spray valve. Residual air must be removed from the can, if this is necessary, by flushing with the propellant gas before crimping.

The initial gas pressure established in the can of the invention having the above noted characteristics is selected dependent upon the product to be dispensed, its viscosity, its ability to atomize, the choice of propellant and the solubility of the propellant in the product. That can may have a starting internal pressure in the range of 50–105 psig or 345–724 kPa depending upon the product and the propellant choice, typically with a compressed gas propellant. Where the propellant is initially a liquified gas, which vaporizes in the can as more propellant is required, like a hydrocarbon propellant, the starting pressure in the can can be as low as 17–31 psig or 117–214 kPa. For mixed liquified and compressed gases, initial pressures may be between 20 and 80 psig or 138–552 kPa. For comparison purposes, note that standard sealed carbonated beverage cans have a normal gas pressure at room temperature of 45 psig or 310 kPa and that the internal pressure increases to 95 psig or 655 kPa at 130° F. or 54.4° C. With the present invention as well, at room temperature, the full aerosol spray dispensing can contents are at 50—105 psig or 345–724 kPa, while at 130° F. or 54.4° C., the pressure increases to the range of 75–120 psig or 517–827 kPa. The invention is contrary to the conventional practice for aerosol spray cans which is to increase pressures rather than decrease pressures. Recommended initial compressed gas pressures for the conventional aerosol can are in the range of 90–140 psig or 620–965 kPa which can increase at 130° F. or 54.4° C. to a range of 100–160 psig or 690–1103 kPa and to over 160 psig or 1103 kPa for liquified propellants.

A smaller wall thickness, low pressure can of the invention is safer than a standard greater wall thickness higher pressure can, because should the lower pressure can burst, explode or be accidentally broken, there would be less pressure and thus less explosive force than with the higher pressure can. Also, the metal fragments, being much lighter, will cause less damage.

Not only is the starting pressure in the can of the invention lower, but the pressure after all of the dispensable product has been dispensed in a spray, foam or stream is therefore also lower for comparable compressed gases. It is typically at about 25–50 psig or 172–345 kPa. This is a sufficient pressure to have dispensed the remaining dispensable product from the can in a spray, foam or stream. It is also sufficient to hold the can walls rigid enough that they should not deform under normal finger pressure in normal use. Further, this leaves only a small amount of gas pressure and quantity in the can and at those levels, the can is not dangerous at disposal. If the user disposes of the empty can which is pressurized at low pressure, there is not a significant explosion danger if the can is broken or incinerated, as might occur with a higher pressure, standard wall thickness, aerosol spray dispensing can. Further, because the can is thinner walled, it has less weight for transportation to a disposal site; and if the can is deposited at a landfill site, and the can is degradable steel, there is less material to degrade.

After the product in the can has been completely dispensed in a desired spray, foam or stream, the residual low gas pressure in the can will cause the can to retains its shape. The low pressure residual gas can be readily and safely finally released in a short time, producing a now non-pressurized can which is easy to crush by hand pressure. This contrasts with standard wall thickness cans which retain a higher pressure and which cannot be crushed by hand pressure even when their gas pressure is released. The easily crushed empty can of the invention is easy to dispose of and recycle. Even if the residual pressure in the can of the invention has not been released by the user, the small amount of residual gas or propellant and the low pressure make it safe to dispose of the can for recycling without danger of injury from fire and explosion. With a smaller amount of propellant required to be initially loaded into the can along with the dispensable product, the system of the invention adds less volatile organic compounds to the atmosphere in most cases. In some cases, the amount of such volatile materials added to the atmosphere is considerably below the currently mandated requirements of several states of the United States. In cases when compressed gas propellants are used, rather than liquified gas propellants, the can of the invention adds no additional volatile organic compounds to the atmosphere.

In order to enable the dispensing of product from the thin walled can of the invention in a desired spray, foam or stream and because there is a lower starting pressure and hence a lower final pressure when all of the dispensable contents of the can have been dispensed, a combination of a valve orifice and valve vapor tap is sometimes needed for certain products to assure that the aerosol spray is finely atomized and exits adequately at lower pressure, yet with a spray quality that is comparable to the high pressure spray obtained with cans with standard can wall thicknesses and the usual high pressure propellants. Liquified propellants are considered high pressure even if they are lower pressure at 70° F. or 21° C. since they are high pressure at 130° F. or 54.4° C.

A valve used with the can of the invention should be able to cooperate with the propellant and the dispensed material to atomize and vaporize the material to enable it to spray out in as fine a spray as the can designer wishes. The valve may include a mechanical break up button in the valve, which breaks up the material into droplets as it is being sprayed.

In addition there may also be a vapor tap in the valve. A vapor tap is a separate pathway through which the propellant gas enters the valve chamber just prior to the outlet from the spray valve. The additional gas that escapes through the vapor tap into the valve chamber assures generation of the spray. Where the propellant is liquid, rather than a compressed gas, and the liquid propellant provides a reservoir for maintaining a constant gas pressure in the can as the liquid is dispensed, the vapor tap may not be needed. Also to dispense substances for which a fine dispersion is not required, the vapor tap is not needed.

Vapor taps were previously used with sprayed powders, paints and some other products containing particles or sticky substances that might clog the valve button orifice. The cross section of the vapor tap was larger than is preferably used with the present invention. For water or other like thin consistency dispensed liquid materials, the vapor tap was developed to help the break up and atomization of the liquid. This is in addition to the flashing off or immediate vaporization as the dispensed material and the volatile propellant just enter the lower pressure ambient atmosphere just past the outlet. The operating theory has always been that the higher the pressure, the better will be the break up of the material.

Vapor taps have been molded into the spray valve and molded vapor taps have had bores on the order of 0.020 inch or 0.508 mm in diameter. In a low pressure aerosol spray dispensing can, where a vapor tap is used, this bore diameter would allow too much of the gas to escape each time material is dispensed and would make use of a low pressure can difficult or impossible. But, recently, a technique of laser boring vapor taps has been developed, which permits the vapor taps to be as narrow as 0.005 inch to 0.008 inch or 0.127 mm to 0.203 mm in diameter. This permits exit from the can of only a much smaller amount of the pressurized gas through the vapor tap and therefore enables the lower initial pressure can to be used. An additional requirement of environmental regulations has been for reduction of the amounts of volatile organic compounds such as propellants that are used in aerosol cans and that are released to the atmosphere. The use of a lower pressure aerosol dispensing can and the use of a vapor tap with a small orifice allows the use of less propellant, affording the invention an additional environmental benefit.

A can according to the invention can be comprised of either steel or aluminum or other materials, thin enough as to be deformable under the forces noted above and to be crushable under the pressures and vacuum noted above. The pressures in the can may be low enough that the can may be made of a plastic material or even a leak sealed paper material, any material capable of holding the pressure.

An important environmental benefit of the invention is the reduction in the amount of metal that is needed for producing each can. A steel can according to the invention uses ½ to ⅓ the amount of steel now used for a similar size, standard, higher internal pressure, aerosol can. In the case of aluminum, the weight reduction is even greater. Because of waste disposal problems, some states in the United States have requested a reduction in the amount of container material and the invention exceeds the currently requested decreases.

Other objects and features of the present invention will become apparent from the following description of a preferred embodiment of the invention considered in conjunction with the accompanying drawings.

DESCRIPTION OF THE PREFERRED EMBODIMENT

Figure 1:
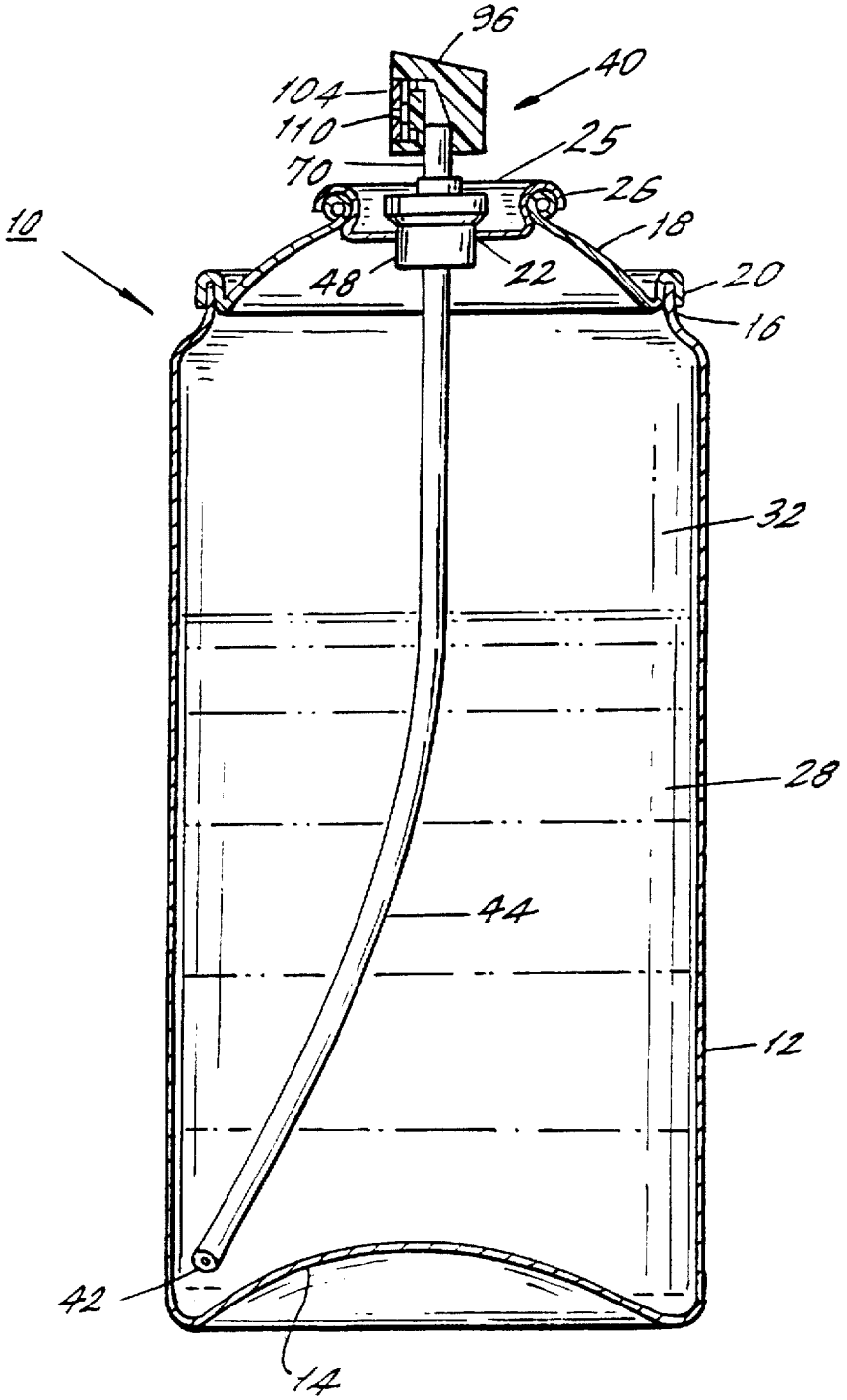
FIG. 1 is a side elevational cross-sectional view through an aerosol spray dispensing can with valve according to the invention.

FIG. 1 shows a low pressure aerosol dispensing can 10 according to the invention. It is shown as a thin walled, steel can 12 with an integrated inwardly domed bottom 14, of the type used for conventional carbonated beverage cans.

The wall thickness of the steel can is about 0.005 inch or 0.127 mm, which is a standard thickness for a carbonated beverage can. A can that thin is deformable under the relatively slight finger force of 5–10 lbs or 2.27–4.55 kilograms. Its shape is maintained against such deformation by normal finger pressure under an internal gas pressure in the can of 25–90 psig or 172–621 kPa. Although the can body 12,14 is described as being of steel, it could alternatively be of aluminum or of other materials, so long as it has the needed qualities. Other inherent features of a can with these characteristics under internal gas pressure are described above in the summary of invention section.

The top of the can is open at 16. A rigid aerosol spray valve dome 18 is applied on the top 16 of the can 12 and the cooperating peripheral top edge of the can and the periphery of the aerosol dome are folded over and crimped at 20 to form a seal, which may be welded or otherwise conventionally sealed. The aerosol dome 18 is of thicker and more rigid steel so that it will not deform either under internal can pressure or external finger pressure and, more important, so that it can support the spray valve and does not distort when the spray dispensing button is depressed and pushed toward the can. The dome 18 has a central opening in its top with a periphery at 22, which is closed by the rigid valve cup 25. The valve cup has a formed peripheral groove to accept the neck finish of the aerosol dome. The dome may alternately have a hole through which the valve is fitted, thus avoiding the use of a valve cup. Alternatively, the top dome may be formed from the upper can wall.

The can 12 is partially filled with fluent, usually liquid, dispensable contents 28 of almost any material that can be or is desired to be dispensed in an aerosol spray, foam or stream. The liquid is typically mixed with a propellant gas of a type discussed above in the summary of the invention section. The liquid contents naturally settle to the bottom of the can and a pressurized head space 32 filled with gaseous propellant develops above the liquid contents 28. That head space enlarges as the liquid contents are gradually dispensed.

The valve cup 25 has a floor 34 that supports a spray valve 40 of generally conventional design, but which has a few known valve features which are specially adapted for effective pressurized spray dispensing, in spray, foam or stream form, of the entire low pressure liquid contents 28 of the can 12. Passage of liquid from the supply of liquid 28, usually mixed with some of the propellant gas, out of the can 12 is through the inlet 42 of the liquid dip tube 44. The pressure in the headspace 32 pushes the liquid up the tube 44.

Figure 2:
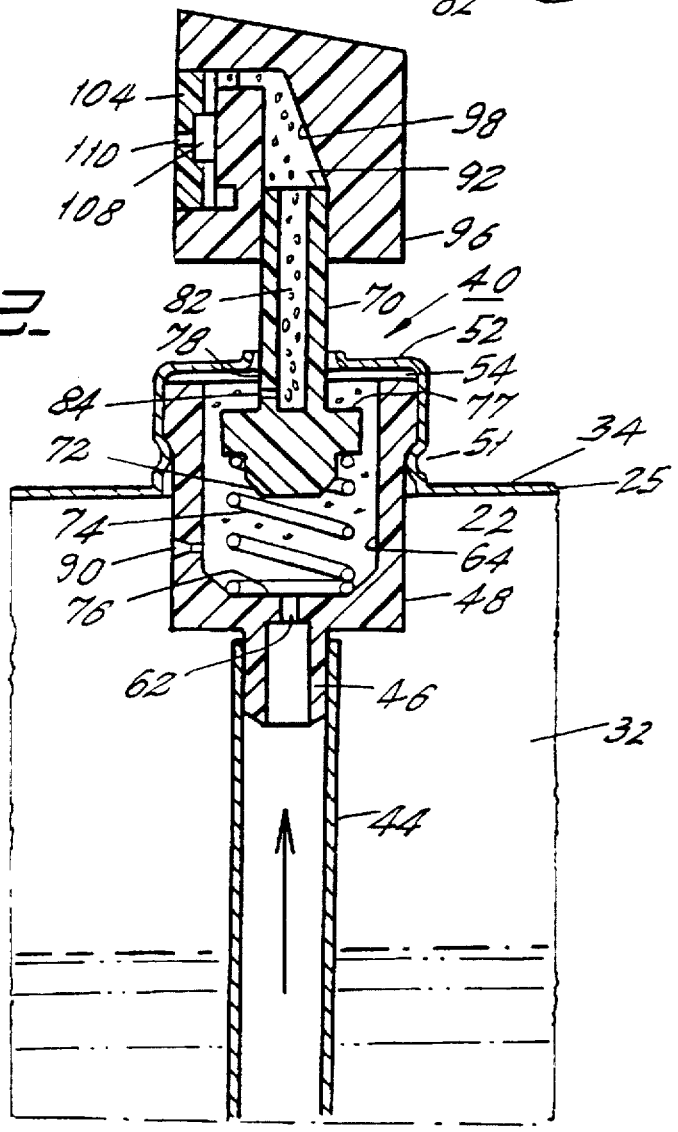
FIG. 2 is an enlarged fragmentary view of the valve region, of the can showing features of the valve.

Referring to FIG. 2, the liquid dip tube 44 is firmly secured on the entrance nipple 46 of the valve body 48. The valve body 48 is secured in the floor 34 of the valve cup 25 at the crimped in connection 51 of the floor to the valve body. The top end of the valve body 48 is open. The valve cup rigid floor 34 is folded at 52 over the open top of the valve body and encloses, beneath the folded over part 52 and above the open top of the valve body, an annular valve stem gasket 54 which closes the valve chamber 64, seals around the below described valve stem 70 and prevents leakage out of the valve chamber 64 along the valve stem 70. If the can is to be used inverted, a dip tube is not necessary.

Liquid passes from the tube 44, through the nipple 46 and through the narrowed cross-section valve body orifice 62 into the wide cross-section interior valve chamber 64 of the valve body. Gas from the head space 32 can enter the valve body chamber 64 through the vapor tap 90, described further below. The liquid moving through the tube 44 is already mixed with some of the propellant gas, which helps fill the valve chamber 64 and also helps atomize the liquid into small droplets.

The valve 70 has a base 72 inside the valve body chamber 64. The stem 70 is continuously biased upward to the valve closed, non-dispensing position by the compression spring 74 extending between the valve stem base 72 and the bottom wall 76 of the valve body 48. The spring 74 urges the stem 70 up until the top side 77 of the base 72 of the valve stem rests against the underside of the gasket 54.

The valve stem 70 extends out of the valve body through a tightly fitted opening 78 in the otherwise sealed valve stem gasket 54. The stem gasket is of a flexible, slightly yieldable and resilient material, which constantly presses against the periphery of the valve stem, seals there against gas leakage, yet permits the valve stem to be moved down by finger pressure and to be returned by the force of the spring 74.

The valve stem has an internal passageway 82, with a narrow valve stem orifice inlet 84 which communicates between the valve body chamber 64 and the valve stem passage 82. The small cross-section orifice 84 restricts the quantity of the liquid contents that can be dispensed. The orifice inlet 84 is so placed that when the valve stem 70 is depressed to the open, spray dispensing condition, which is the position shown in FIG. 2, the orifice 84 is in the valve body chamber 64 and the contents of the chamber will gradually exit through the orifice 84. When the valve stem is up under the force of the spring 74, the orifice 84 is out of the chamber 64 and perhaps inside and protected by the gasket 54. But the orifice 84 being outside the chamber 64 prohibits exit of material from the valve body chamber 64 and from the can 12.

Especially because the can 12 is pressurized only to a low level for certain products, enough gas must enter the valve body chamber 64 to help to atomize the liquid. For this purpose, a vapor tap 90 in the form of a very narrow bore orifice of about 0.006 inch or 0.152 mm., for example, is formed in the valve body sidewall 48, which is typically of plastic. Techniques of laser boring of very small orifices have recently been developed, enabling the orifice 90 to be of particularly small cross-section, (0.005–0.008 inch or 0.127–0.203 mm.) for permitting only a small flow rate of gas from the head space 32 through the vapor tap 90 and into the valve body chamber 64. Were the vapor tap orifice 90 too large or conventionally as large as 0.020 inch, 0.508 mm. the gas in the head space 32 would be dispensed too rapidly. This would reduce the gas pressure in the can so rapidly that less than all of the liquid contents in the can would be dispensed. Therefore, the low pressure aerosol dispensing can will operate best for certain products when there is not sole reliance upon the gas dissolved in the pressurized liquid and compressed above it to supply all of the aerosol spray dispensing gas to the valve chamber 64 and when a vapor tap is used having a narrow orifice. For certain types of gaseous propellants, such as chlorofluorocarbons, hydrocarbons, and other liquified gas propellants which evaporate into a gaseous form and propellants that are easily dissolved in the liquid product being dispensed, an additional vapor tap may not be required, even for a low pressure aerosol dispensing can.

Figure 4:
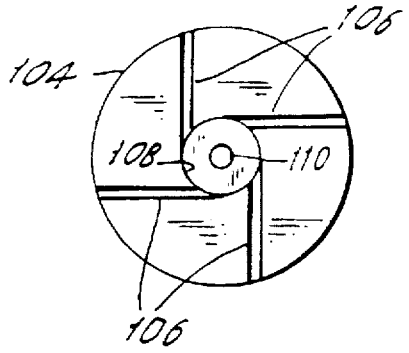
FIG. 4 is a view outward of the interior of the spray button along line 4 in FIG. 3.
Figure 3:
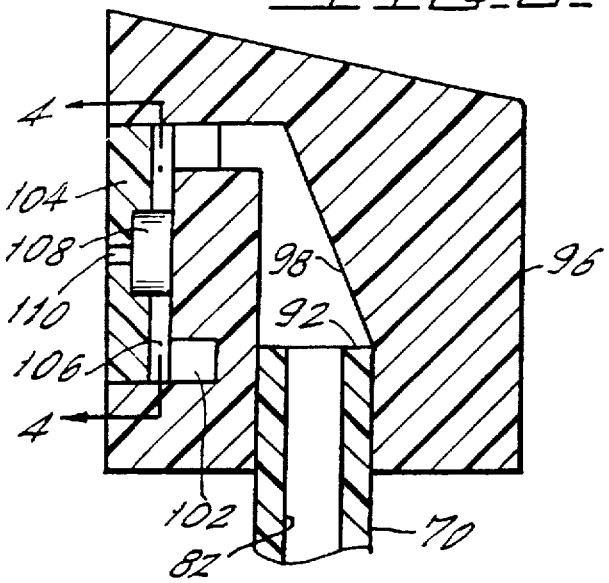
FIG. 3 is an enlarged fragmentary view of the valve, stem and spray button.

Turning now to the outlet from the valve stem, the outlet end 92 of the valve stem 70 extends into a receiving chamber 98 in the manually operated spray button 96. The spray button provides mechanical breakup of the previously formed drops and remaining liquid. From the top of the spray tube, the exit pathway for the mixed liquid droplets and gas is through the narrowing chamber 98 and into an annular flow distribution chamber 102, which is defined by an annular groove spaced inward from the front face of the spray button 96. The annular chamber 98 is covered by a nozzle disk insert 104 (FIG. 4) having a plurality of tangential flow orifices 106, which blow gas and liquid droplets tangentially into the circular swirl chamber 108. The droplets and gas then pass out the nozzle orifice 110 under a spray force determined by the various elements of the valve and the pressure in the can. Many variations of a mechanical break up nozzle can be used. Some are molded in, so that a disk insert is not needed.

The invention described above is adapted for use with other designs of valves for aerosol spray, foam or stream dispensing. The only requirement is that the valve be adapted to dispense only a small quantity of the liquid contents and a small quantity of the gas, so as not to exhaust the liquid and gas supply too rapidly nor to waste the gas pressure and the liquid contents. The characteristic features of the valve are selected to cause the proportion of liquid and gas flow to be the proper ratio to achieve those objectives. Other aerosol spray valves that accomplish those objectives may be used.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A low pressure, non-barrier type, valved dispensing can for containing and dispensing fluent materials by compressed and/or liquified gas the can comprising:

a generally cylindrical can having a wall of such a material and with such a thickness that when the can is unpressurized, the can wall is easily distortable by normal finger pressure and is easily crushable by normal hand pressure, but when the can is pressurized, the can is rigid enough to not be easily distortable and crushable by normal finger and hand pressure;

the can being adapted for containing propellant and fluent material to be dispensed, the propellant and fluent material not being separated by a barrier in the can between them;

a dispensing valve on the can with a valve orifice adapted to be opened to dispense a desired quantity and rate of flow of fluent material and propellant in selected spray, foam or stream form in a manner such that the can will retain enough propellant pressure to expel substantially all of the dispensable fluent material in the can.

2. The can of claim 1, wherein the can side wall thickness is such that an internal pressure in the can is required to give the can its rigidity, and this internal pressure prevents normal finger pressure from distorting the side wall and normal hand pressure from crushing the can.

3. The can of claim 2, including the fluent material and the propellant in the can, wherein the type and amount of the propellant are selected so that the pressure of the propellant which is used to dispense controlled amounts of the fluent material is the same pressure which gives the can wall the required rigidity for preventing normal finger and hand pressure from distorting and crushing the can.

4. The can of claim 2, including the fluent material and the propellant in the can, wherein the propellant is both for generating the pressure which dispenses the fluent material in a controlled manner and is for giving the can wall the required rigidity.

5. The can of claim 2, where the thickness of the can wall is such that the can, when pressurized to 100 psig or 689.5 kPa, expands across the diameter by at least one and one half thousands of the diameter.

6. The can of claim 4, where the valve can be easily and repeatedly opened and closed.

7. The can of claim 4, wherein the can also has a top and a bottom which are joined to the can wall and close the can; the amount and type of propellant is selected to give the can rigidity and is sufficient to dispense substantially all of the fluent material but the can is of such side wall, top and bottom construction that the pressure of the selected propellant does not cause the can to exceed the regulatory distortion and burst requirements.

8. The can of claim 7, where the can side wall, bottom and top are of such thickness and the type and quantity of propellant are selected so that the can will not permanently distort at 130° F. or 54.4° C. and will not burst at one and one half times the pressure generated by the propellant at 130° F. or 54.4° C.

9. The can of claim 8, where the can is a metal can with a wall thickness of at most 0.0065 inches or 0.165 mm in a can of approximately 2 1/16 inches or 52.4 mm in diameter.

10. The can of claim 8, where the can is a metal can with a wall thickness of 0.0075 inches or 0.191 mm or less in a can of approximately 2 5/8 inches or 66 m in diameter.

11. The can of claim 8, where the can is a metal can with a wall thickness of 0.008 inch or 0.216 mm or less in a can of approximately 3 inches or 76 mm in diameter.

12. The can of claim 9, wherein the wall thickness for the 2 1/16 inch or 52.4 mm diameter can is 0.0034–0.0055 inch or 0.086–0.139 mm.

13. The can of claim 10, where the wall thickness for the 2 inch or 66 mm diameter can is 0.005–0.007 inch or 0.127–0.178 mm.

14. The can of claim 11, where the wall thickness for the 3 inch or 76 mm diameter can is 0.006–0.008 inch or 0.152–0.203 mm.

15. The can of claim 8, the side walls of which will not withstand an internal vacuum of more than 18 inches or 46 cm of mercury without collapsing.

16. The can of claim 1, wherein the valve includes a valve body with a chamber inside the valve body communicating with the atmosphere, a valve body orifice communicating between the interior of the can and the valve chamber, the orifice being of a cross sectional size sufficient to permit the fluent material and the mixed propellant to pass through the valve chamber and be expelled to the atmosphere in an aerosol spray, stream or foam while they are being transmitted into the valve chamber at a slow enough rate that all of the fluent dispensable material in the can be dispensed under pressure by and with the propellant.

17. The can of claim 16, wherein the valve body further includes a vapor tap of narrower cross-section than the cross-section of the valve body orifice and the vapor tap communicating into the can for receiving pressurized propellant therefrom and communicating into the valve chamber before the exit to the atmosphere for providing extra propellant to help atomize and disperse the fluent material.

18. The can of claim 17, wherein the vapor tap is of a narrow bore of about 0.005–0.007 inch or 0.127–0.178 mm.

19. A process for dispensing fluent material in an aerosol spray, the process comprising:

filling a can with a fluent dispensable material and a gaseous propellant which are mixed together to a pressure of at most about 105 psig or 724 kPa at about normal room temperature, wherein the can has the following characteristics:

a generally cylindrical can having a wall and bottom of a thickness such that it will permanently distort at an internal pressure in excess of 120–130 psig or 827–896 kPa and that the wall and bottom will not burst at an internal pressure one and one half times that of permanent distortion said generally cylindrical can having a wall of such a material and with such a thickness that when the can is unpressurized, the can wall is easily distortable by normal finger pressure and is easily crushable by normal hand pressure, but when the can is pressurized, the can is rigid enough to not be easily distortable and crushable by normal hand and finger pressure;

the can being adapted for containing propellant and fluent material to be dispensed, the propellant and fluent material being mixed and the can being without internal barrier between the propellant and the material to be dispensed;

placing propellant in the can to an amount such that when the can is pressurized sufficiently to provide propellant to expel all of the dispensable fluent material in the spray, stream or foam form, the can will not permanently distort at temperatures below 130° F. or 54.4° C. and the pressurized can cannot be deformed inwardly by normal finger pressure on the can wall;

the method further comprising applying a valve to the can for closing the can, the valve having the ability to dispense a mixed quantity of dispensable fluent material and propellant in a manner such that the can will retain enough propellant pressure to expel substantially all of the fluent dispensable material in an acceptable spray, stream or foam form.

*20. A low pressure, non-barrier type, aerosol spray valved dispensing can for containing and dispensing fluent materials in aerosol spray form by compressed and/or liquified gas the can comprising:*

*a generally cylindrical can having a wall of such a material and with such a thickness that when the can is unpressurized, the can wall is easily distortable by normal finger pressure and is easily crushable by normal hand pressure, but when the can is pressurized, the can is rigid enough to not be easily distortable and crushable by normal finger and hand pressure;*

*the can being adapted for containing propellant and fluent material to be dispensed, the propellant and fluent material not be separated by a barrier in the can between them;*

*an aerosol spray dispensing valve on the can with a valve orifice adapted to be opened to dispense a desired quantity and rate of flow of fluent material and propellant in an aerosol spray form and in a manner such that the can will retain enough propellant pressure to expel substantially all of the dispensable fluent material in the can.*

*21. The can of claim 20, wherein the can side wall thickness is such than an internal pressure in the can is required to give the can its rigidity, and this internal pressure prevents normal finger pressure from distorting the side wall and normal hand pressure from crushing the can.*

*22. The can of claim 20, including the fluent material and the propellant in the can, wherein the type and amount of the propellant are selected so that the pressure of the propellant which is used to dispense controlled amounts of the fluent material is the same pressure which gives the can wall the required rigidity for preventing normal finger and hand pressure from distorting and crushing the can.*

*23. The can of claim 20, including the fluent material and the propellant in the can, wherein the propellant is both for generating the pressure which dispenses the fluent material in a controlled manner and is for giving the can wall the required rigidity.*

*24. The can of claim 20, where the thickness of the can wall is such that the can, when pressurized to 100 psig or 689.5 kPa, expands across the diameter by at least one and one half thousands of the diameter.*

*25. The can of claim 23, wherein the can also has a top and a bottom which are joined to the can wall and close the can; the amount and type of propellant is selected to give the can rigidity and is sufficient to dispense substantially all of the fluent material but the can is of such side wall, top and bottom construction that the pressure of the selected propellant does not cause the can to exceed the regulatory distortion and burst requirements.*

*26. The can of claim 20, wherein the aerosol spray dispensing valve includes a valve body with a chamber inside the valve body communicating with the atmosphere, a valve body orifice communicating between the interior of the can and the valve chamber, the orifice being of a cross sectional size sufficient to permit the fluent material and the mixed propellant to pass through the valve chamber and be expelled to the atmosphere in an aerosol spray while they are being transmitted into the valve chamber at a slow enough rate that all of the fluent dispensable material in the can be dispensed under pressure by and with the propellant.*

* * * * *